US010726527B2

(12) United States Patent
Cresens et al.

(10) Patent No.: US 10,726,527 B2
(45) Date of Patent: Jul. 28, 2020

(54) METHOD FOR REDUCING IMAGE DISTURBANCES CAUSED BY RECONSTRUCTED DEFECTIVE PIXELS IN DIRECT RADIOGRAPHY

(71) Applicant: Agfa HealthCare NV, Mortsel (BE)

(72) Inventors: Marc Cresens, Mortsel (BE); Herman Van Goubergen, Mortsel (BE)

(73) Assignee: AGFA NV, Mortsel (BE)

( * ) Notice: Subject to any disclaimer, the term of this patent is extended or adjusted under 35 U.S.C. 154(b) by 123 days.

(21) Appl. No.: 15/761,436

(22) PCT Filed: Sep. 20, 2016

(86) PCT No.: PCT/EP2016/072249
§ 371 (c)(1),
(2) Date: Mar. 20, 2018

(87) PCT Pub. No.: WO2017/050733
PCT Pub. Date: Mar. 30, 2017

(65) Prior Publication Data
US 2019/0050970 A1    Feb. 14, 2019

(30) Foreign Application Priority Data
Sep. 21, 2015   (EP) .................................... 15186056

(51) Int. Cl.
*G06T 5/00*    (2006.01)

(52) U.S. Cl.
CPC .... *G06T 5/005* (2013.01); *G06T 2207/10116* (2013.01); *G06T 2207/20012* (2013.01); *G06T 2207/20021* (2013.01); *G06T 2207/20024* (2013.01)

(58) Field of Classification Search
CPC ........... G06T 5/005; G06T 2207/20021; G06T 2207/20024; G06T 2207/20012; G06T 2207/10116
USPC ....... 382/165, 260, 300, 167, 275, 276, 293, 382/298, 299, 252, 162, 254; 348/207.99, 348/222.1, 241, 246, 247, 243, 231.99
See application file for complete search history.

(56) References Cited

U.S. PATENT DOCUMENTS

| 5,875,040 | A | 2/1999 | Matraszek et al. |
| 6,529,622 | B1 * | 3/2003 | Pourjavid ............. H04N 5/367 |
| | | | 250/370.09 |

(Continued)

OTHER PUBLICATIONS

Official Communication issued in International Patent Application No. PCT/EP2016/072249, dated Nov. 21, 2016.

*Primary Examiner* — Sheela C Chawan
(74) *Attorney, Agent, or Firm* — Stinson LLP

(57) ABSTRACT

A method for removing defective pixel image-artifacts includes an adaptive reconstruction kernel taking up to four main and diagonal, defect-free sub-kernel directions into account composed for each defective image pixel. The defective pixels impacted image is real-time corrected by statistical filtering or by a weighed directional convolution of kernel-associated replacement values, calculated by means of an advanced multi-parabolic reconstruction algorithm, for each contributing sub-kernel direction based on 5×5 pixels neighborhood image data readily accessible via a predetermined AMP kernels image-offsets structure.

10 Claims, 16 Drawing Sheets

(56) References Cited

U.S. PATENT DOCUMENTS

| | | | |
|---|---|---|---|
| 6,690,842 B1* | 2/2004 | Silver | G06T 7/12 |
| | | | 382/199 |
| 6,950,211 B2* | 9/2005 | Trifonov | G06T 5/002 |
| | | | 358/3.26 |
| 7,864,993 B2* | 1/2011 | Maack | G06T 5/005 |
| | | | 382/128 |
| 10,010,303 B2* | 7/2018 | Konno | A61B 6/032 |
| 2003/0179418 A1 | 9/2003 | Wengender et al. | |
| 2008/0231734 A1 | 9/2008 | Enomoto | |

* cited by examiner

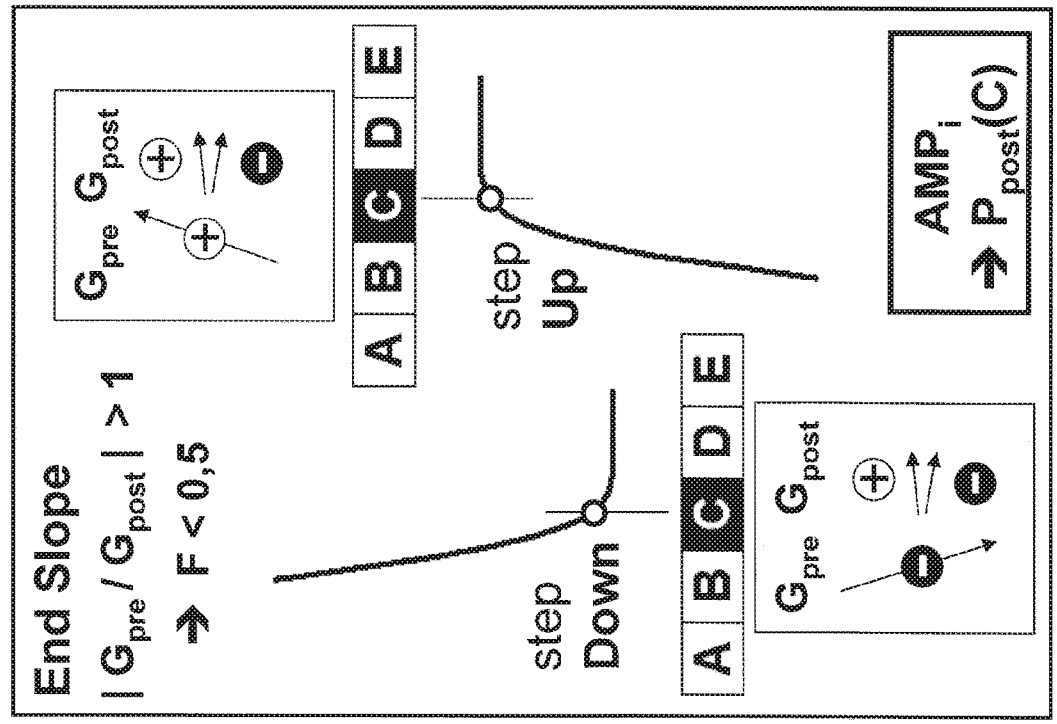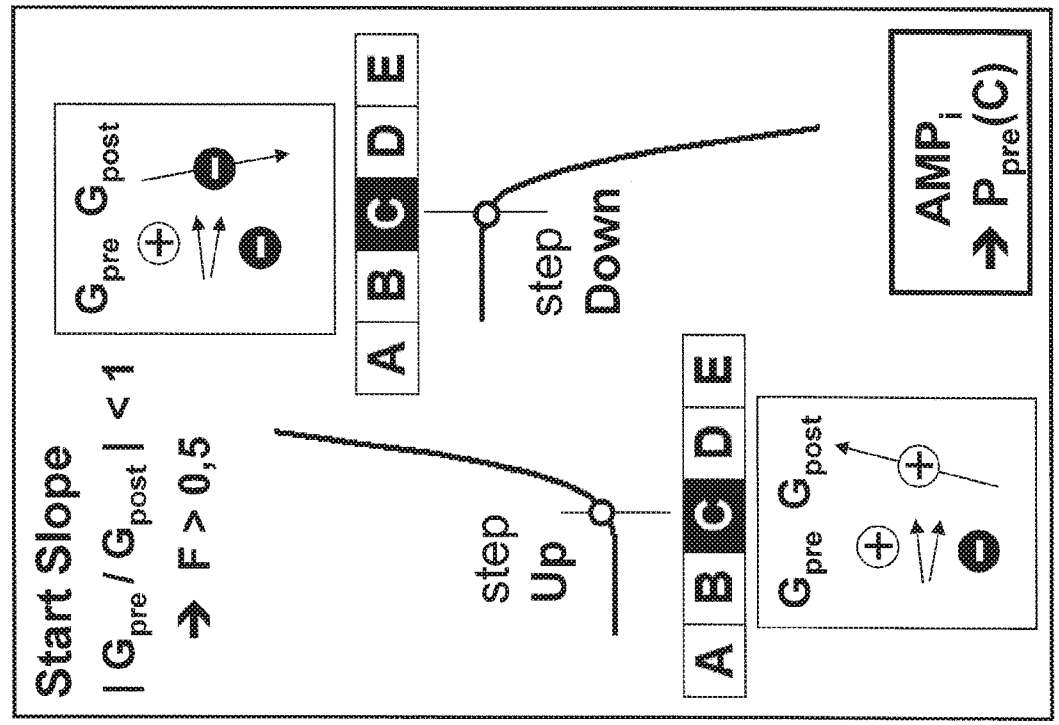
fig. 8

METHOD FOR REDUCING IMAGE DISTURBANCES CAUSED BY RECONSTRUCTED DEFECTIVE PIXELS IN DIRECT RADIOGRAPHY

CROSS REFERENCE TO RELATED APPLICATIONS

This application is a 371 National Stage Application of PCT/EP2016/072249, filed Sep. 20, 2016. This application claims the benefit of European Application No. 15186056.6, filed Sep. 21, 2015, which is incorporated by reference herein in its entirety.

BACKGROUND OF THE INVENTION

1. Field of the Invention

The present invention relates to direct radiography. The invention more particularly relates to a method for removing defective pixel image-artifacts in such a way that the reconstructed defective line(-piece)s, curve(-piece)s, small clusters, and isolated pixels more closely represent the original data. Moiré effects and contrast loss in areas with high spatial frequency patterns or densely distributed local minima and maxima, are reduced.

2. Description of the Related Art

Static and dynamic flat panel detector based x-ray imaging systems are commonly used in various application areas ranging from non-destructive testing to medical diagnosis.

Although these complex, solid state sensor based image-acquisition devices are calibrated on a regular basis to determine and compensate for the various sources of spread in the signal conversion characteristics of their sensor-pixels, array-wise arranged in the detector's sensitive entry-surface, some of these sensor-pixels are defective or behave irregular causing their image-data to be non-representative for the amount of light or x-rays they have been exposed to during signal integration.

The majority of these unreliable sensor-pixels, often referred to as defective pixels generating invalid image-data, are isolated pixels which are distributed across the surface of the array-sensor. Direct neighbor kernel based reconstruction algorithms making use of the eight non-defective image-data immediately surrounding the isolated defective pixel are sufficient to calculate a very effective replacement value for the defective pixel. The defective pixel becomes well hidden after reconstruction and its uncorrected image-artifact, the local image-impact, disappears nearly completely.

Even when the reconstruction value of that isolated pixel might slightly differ from its normal value, the image data generated at that specific image-location in case the sensor-pixel wouldn't have been defective, a small reconstruction error still remains hardly detectable in the corrected image.

Depending on the nature and the type of the physical phenomenon which is responsible for the invalid or unstable exposure-response of a defective pixel, groups of clustered defective pixels with various shapes and spatial extent are inevitably generated too.

The image-impact of defective curve wise or line wise clustered defective pixels is larger since a multitude of consecutive, chain wise grouped image-pixels are affected and must be reconstructed. Sub-optimal defect reconstruction can more easily generate disturbing, visible image-artifact, revealing the inadequately hidden presence and the larger spatial extent of chained multi-pixel array sensor defects.

This phenomenon becomes even worse if these larger defective pixel structures occur in image regions where high spatial frequency patterns are present as often found in technical images or in diagnostic images containing line-wise or curved strong signal gradients at the edges of implants or catheter wires.

State of the art defective pixel reconstruction algorithms relying on a kernel average, a kernel median or even on a local gradient controlled directional reconstruction operation performed on the defective pixel's neighboring kernel data are unable to reconstruct local high frequency data substantially above or below the surrounding image data range. Their reconstruction errors thus introduce high frequency contrast loss and this can generate extremely disturbing Moiré-like artifacts in combination with slightly skewed high spatial frequency patterns possibly present in the image.

SUMMARY OF THE INVENTION

Preferred embodiments of the invention reconstruct defective pixel lines, curves, small clusters and pixels located in image-regions with periodic high spatial frequency content with minimal residual reconstruction errors to optimally reduce their disturbing or miss-leading image-impact in order to improve the workflow and the quality of the visual inspection performed after diagnostic image acquisition.

Further aspects will become apparent from the description given below.

The above-mentioned advantages and benefits may be achieved by a method having the specific features as set out below.

Other specific features for preferred embodiments of the invention are also set out below.

With a method according to a preferred embodiment of the present invention it will be possible to obtain a high quality reconstruction of defective flat panel detector lines, curves, small clusters and individual pixels with reduced local contrast loss and disturbing Moiré-like reconstruction artifacts especially in regions where high spatial frequency patterns are present in the image.

Preferred embodiments of the invention focus on the composition of an adaptive reconstruction kernel and on an advanced multi-parabolic reconstruction process which is executed for each of these contributing sub-kernel directions.

The method relies on defective pixel location information derived from a predetermined defective pixels structure. Each defective image pixel receives its own spatially adapted 5×5 pixel reconstruction kernel which is composed of up to four defect-free, directional 5×1 pixel sub-kernels.

The entire set of adaptive AMP reconstruction kernels needed the correct the defect impacted image is stored in a kernel geometry structure.

The spatial data contained in the defective pixels structure is merged with adaptive multi parabolic sub-kernel descriptions in the sub-kernel models structure to upfront create an image-offset table for fast image-data access during real-time defective pixels reconstruction.

Reconstruction values are calculated for the contributing set of defective-pixel centered sub-kernels by defining two neighborhood parabola and by calculating parabolic interpolation values along with gradient-ratio controlled bias corrections for the defective pixel location based on the four image data elements associated with each sub-kernel.

Either directionally weighed average convolution or statistical filtering of the kernel's contributing sub-kernel reconstruction values is used to calculate the replacement value for the defective image pixel resulting into a substantially improved high spatial frequency response.

In one embodiment a replacement value is obtained by a weighed average value calculation using said pre-parabolic and post-parabolic interpolation values and weight-factors associated with said interpolation values.

A first of the associated weight-factors F may be determined within the 0 to 1 value range by an adaptive bias control system and a second weight-factor may be determined as 1-F.

In a specific embodiment the adaptive bias control system calculates the bias control weight-factor using slope-gradients information derived from said pre-parabola at a pixel location just before said defective pixel and from said post-parabola at a pixel location just after said defective pixel.

The bias control weight-factor may be calculated from the absolute value of the slope gradients ratio raised to the power of a settable bias control sensitivity parameter.

In this embodiment the slope gradient of said pre-parabola may be calculated at the location situated in the middle between said defective pixel and the kernel pixel immediately before said defective pixel and the slope gradient of said post-parabola may be calculated at the location situated in the middle between said defective pixel and the kernel pixel immediately after said defective pixel.

The slope gradient of said pre-parabola may be calculated as the difference between the pre-parabolic interpolation value and image data at the pixel location immediately before said defective pixel and wherein the slope gradient information of said post-parabola may be calculated as the difference between image data at the pixel location immediately after said defective pixel and the post-parabolic interpolation value.

In all embodiments the adaptive reconstruction kernel of said defective pixel may be composed by combining multiple, defect-free, main or diagonal direction 5×1 pixel kernels and wherein said replacement value may be calculated as a weighed average directional convolution of the individual replacement values calculated for the contributing directional kernels.

The adaptive reconstruction kernel of said defective pixel may be composed by combining multiple, defect-free, main or diagonal direction 5×1 pixel kernels and the replacement value may be calculated as the median value of individual replacement values calculated for the contributing directional kernels.

In specific embodiments weight-factors used for the multi-directional weighed average convolution calculation are different for the contributing main and diagonal kernel directions.

The present invention is generally implemented as a computer program product adapted to carry out the method of any of the claims when run on a computer and is stored on a computer readable medium.

Further advantages and embodiments of the present invention will become apparent from the following description and drawings.

BRIEF DESCRIPTION OF THE DRAWINGS

FIG. 8 shows several sub-kernel data instances resulting into highly pre- or post parabolic interpolation biased contributions.

DETAILED DESCRIPTION OF THE PREFERRED EMBODIMENTS

An x-ray or light sensitive array-sensor, a crucial opto-electronic component of each flat panel detector system, acts as a planar transducer which converts the spatial distribution of the time-integrated impinging x-ray radiation captured at pixel resolution into a set of digital data which can be exported as an uncorrected image.

To be able to do this the large-area array-sensor is often built up as a stack of contacting and or fused layers. A scintillator material arranged at the radiation entry side of the detector is used as a first layer to convert impinging x-rays into emitted light. The electronic array-layer consists of photo-sensitive pixel-elements like reverse biased PIN diodes which convert the locally impinging emitted light into electric charge carriers which can be captured during time integration and locally stored in the pixel as an x-ray exposure representative charge-package. A third layer carries a vast array of electronic switches used to transfer the captured charge towards read-out and conversion electronics as indicated by the read-out control signals. Additional intermediate and external layers with leads and electrodes, often arranged in a column- and row-wise patterns, are added to interconnect the electronic components arranged in the various layers with each other, with the switching lines, with the charge-collecting lines and with the pixel's other control lines. Direct conversion x-ray sensors as used in amorphous selenium based detector systems don't require a scintillator layer to convert the x-rays into charge-carriers and are built up differently.

Figure 1:
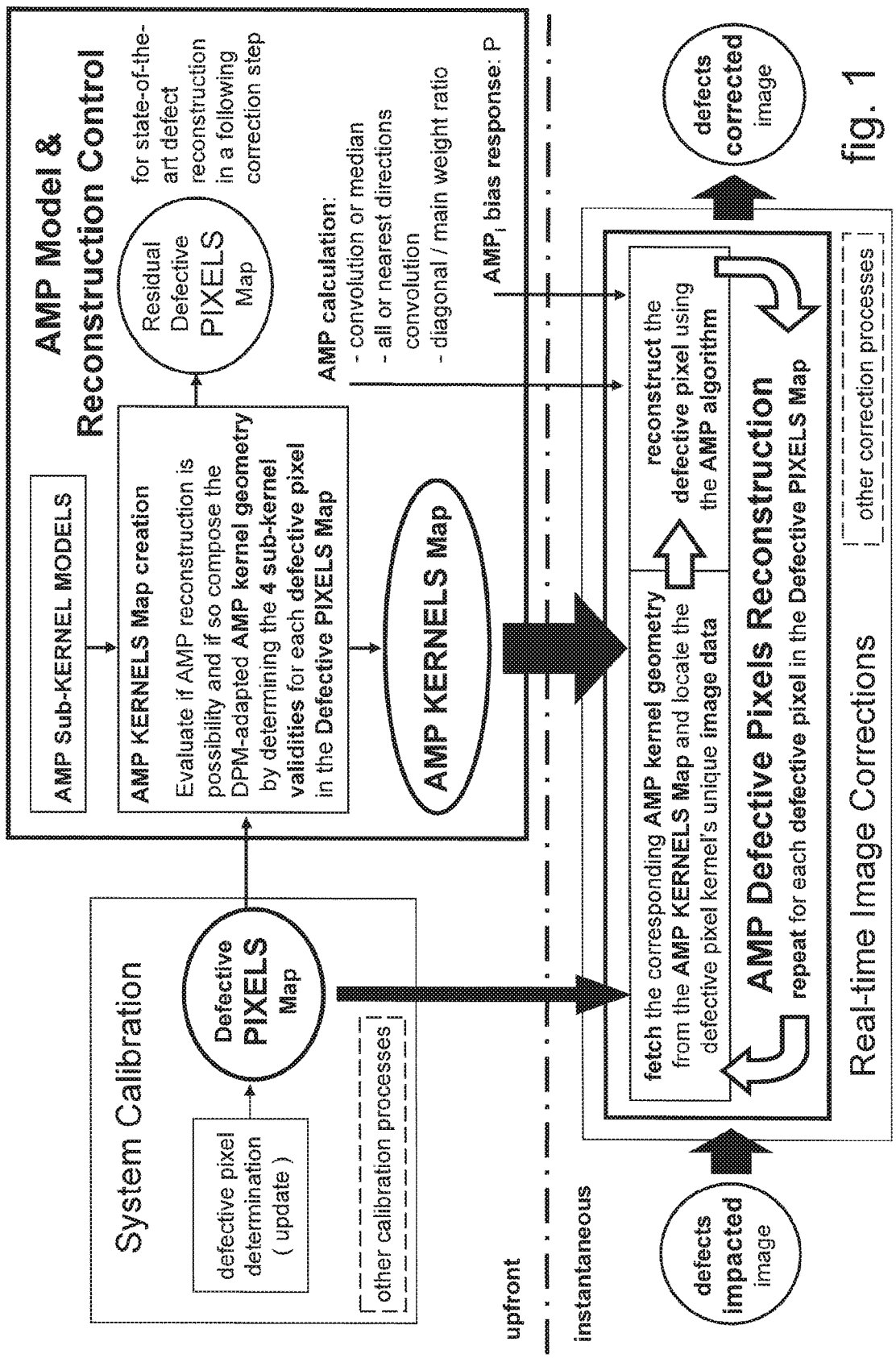
FIG. 1 represents the Advanced Multi Parabolic based defective pixels reconstruction flow-diagram including its related data structures, model and parameter controls.

FIG. 1 represents the Advanced Multi Parabolic (AMP) reconstruction flow-diagram.

Upon initial calibration of a flat panel detector based direct radiography system in the factory as well as during acceptance testing, during periodic quality control or after repair or move of the system in the field a data-validity structure indicating the defective or non-defective state of each individual sensor-pixel as a function of its location in the sensor-array image, named Defective PIXELS Map here, is actualized.

This updating of the data-validity state structure can be executed as a separate defective pixel determination process but is often part of the upfront-executed, off-line calibration activities performed periodically as a prerequisite activity to ensure an adequate, instantaneous defective pixel correction of acquired images at any time.

For each invalid flat panel sensor pixel, flagged in the Defective PIXELS Map as defective or exhibiting temporal or thermal instability, a defective pixel reconstruction value must be calculated during real-time reconstruction to replace the spatially corresponding image-data in the defects impacted image.

To be able to reconstruct a local defect the reconstruction process must know its defective pixel-location, which kernel-size and adapted kernel-geometry must be used and what type of reconstruction operation must be performed on the adaptive kernel-associated image-data.

All this information is provided upfront by the AMP Model & Reconstruction Control block. The predefined AMP Sub-Kernel MODELS structure contains a number of fixed, directional sub-kernels which can be combined to form the defective pixel's individual AMP kernel.

For nearly each element in the Defective PIXELS Map a neighborhood-adapted AMP kernel description is composed and added to the AMP KERNELS Map structure.

Before the AMP kernel of a defective pixel can be composed each predefined sub-kernel is centered about the defective pixel's location in the Defective PIXELS Map to find out if its corresponding sensor-pixels are all non-defective. If none of the examined DP-centered sub-kernels is free of neighboring defective pixels an AMP reconstruction kernel for that specific defective pixel can not be composed.

In case the defective pixel is surrounded by a too defective neighborhood, it is added to the Residual Defective PIXELS Map for defect reconstruction using state-of-the art algorithms in a following correction step.

During the real-time image corrections phase either a directionally weighed convolution or statistical filtering like calculation of the median can be executed on the various contributing $AMP_i$ sub-kernel reconstruction results obtained to calculate the defective pixel's AMP reconstruction value based on the selections made and the parameters defined upfront.

The defective pixel reconstruction process is executed in real time as part of a set of instantaneously executed image correction activities necessary to calculate a defect corrected image with minimal processing-delay for each array-sensor frame presented to the image processing chain in a static single-frame or a dynamic multi-frame image acquisition mode. The use of a predetermined, fast access, image-offset data-structure merging the spatial information derived from the Defective PIXELS Map with the spatial descriptions of the reconstruction kernel compositions significantly reduces the overall reconstruction delay by minimizing the inevitable time-loss associated with the vast number of image-data fetch and image-data replace operations executed while reconstructing the several thousands of defective or unreliable image-data per image-frame.

Figure 2:
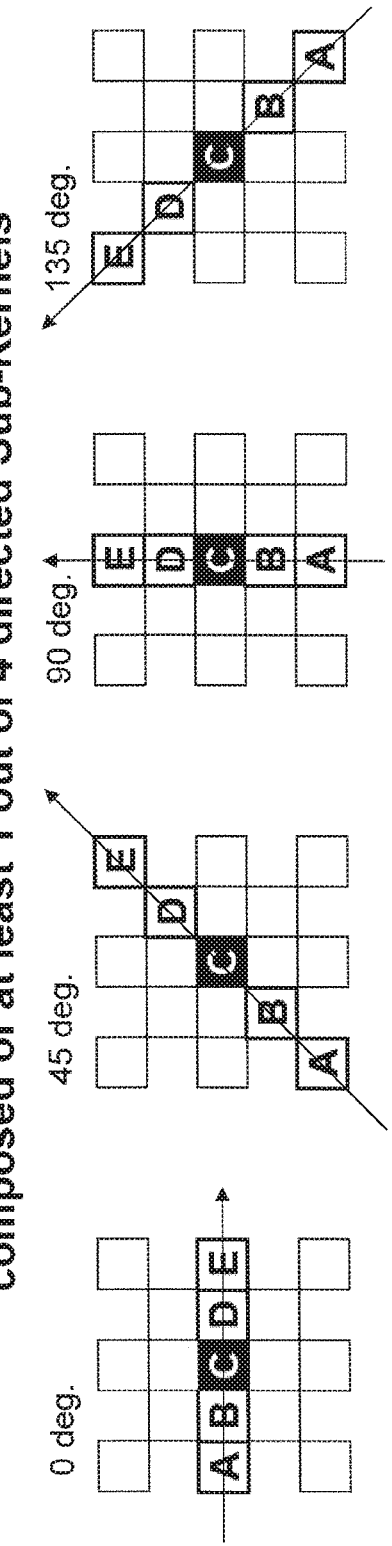
FIG. 2 shows the AMP Kernel model as composed of multiple, directed sub-kernels.

FIG. 2: The AMP Kernel model contains four directed sub-kernels. Each of these sub-kernels addresses a specific data-sequence direction. Four defective pixel centered sub-kernels are defined inside a 5×5 pixel-matrix.

The C-position refers the central location of the defective pixel and is obviously excluded from each sub-kernel.

Sub-kernel$_0$ and sub-kernel$_{90}$ represent the horizontal and the vertical main directions and their four kernel-locations: A,B and D,E are pair wise side-neighbors at pixel-pitch distance. Sub-kernel$_{45}$ and sub-kernel$_{135}$ represent both diagonal directions and their four kernel-locations: A,B and D,E are pair wise corner-neighbors at 1.4× the pixel-pitch distance.

Each defective pixel receives its individually composed AMP kernel based on the occasional presence and location of other neighboring defective pixels inside the 5×5 pixel matrix. Each AMP Sub-Kernel only contributes if its A, B, D and E locations refer to image-data originating from non-defective sensor-array pixels.

One up to four sub-kernels picked from the AMP Sub-KERNEL MODELS are combined after defect-verification for each individual defective pixel to compose its neighborhood-adapted AMP reconstruction kernel which is added to the AMP KERNELS Map structure.

Figure 3:
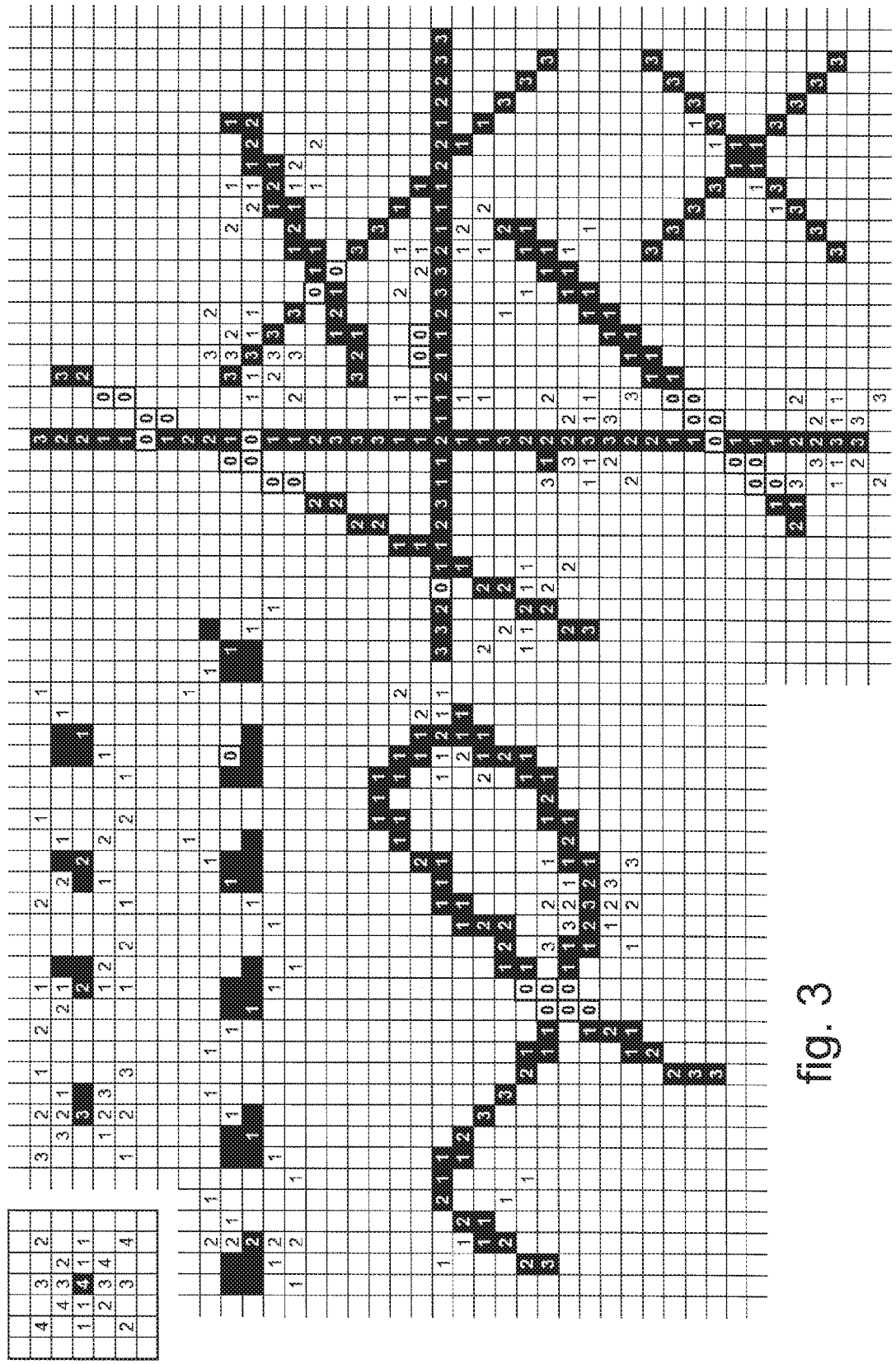
FIG. 3 shows the amount of sub-kernel directions taken into account during the AMP reconstruction of defective lines, curves and clusters examples.

FIG. 3 shows the amount of sub-kernel directions combined to compose the defective pixel map adapted AMP Kernel for a multitude of defective pixels located in defective lines, defective curves, defective clusters and in an isolated defective pixel.

From the examples given top-left it is obvious that all four sub-kernel directions contribute to the kernel-formation of a solitary defective pixel.

The drawing numbers the four possible sub-kernels differently and the amount of contributing sub-kernels marks the central DP location.

Continuing to the right the solitary defective pixel gradually grows to become a 2×2 defective pixel cluster.

The drawing shows how the amount of contributing sub-kernel directions decreases with the increasing size of the defective pixel cluster. The directional geometry of these composed AMP kernels automatically adjusts to the location of other defective pixels in the neighborhood of DP.

For a 2×2 defective pixel cluster each of the cluster pixels still has one defect-free, diagonal sub-kernel available for adaptive AMP kernel formation. The slightly larger defective cluster, composed of 5 defective pixels in a 3×2 pixel configuration, still has 4 of its defective pixels for which an AMP kernels can be composed. The 0-marked $5^{th}$ defective pixel, whose neighboring defective pixels are located such that none of the sub-kernels is free of other defective pixels, is added to the Residual Defective PIXELS Map.

A vast, curved-shaped defective pixel structure is shown below left. Although the majority of its defective pixels have adaptive AMP kernels composed of 1 up to 3 sub-kernels, a few 0-marked defective pixels at the x-shaped intersection of the curve will require a different type of defective pixel reconstruction.

Shown on the right are horizontal, vertical and various differently inclined defective line(pieces) structures for which the AMP kernels for some of their defective pixels are shown.

The majority of the defective pixels here as well as some located at the line-crossings have at least one available sub-kernel direction and can thus be AMP reconstructed.

Figure 4:
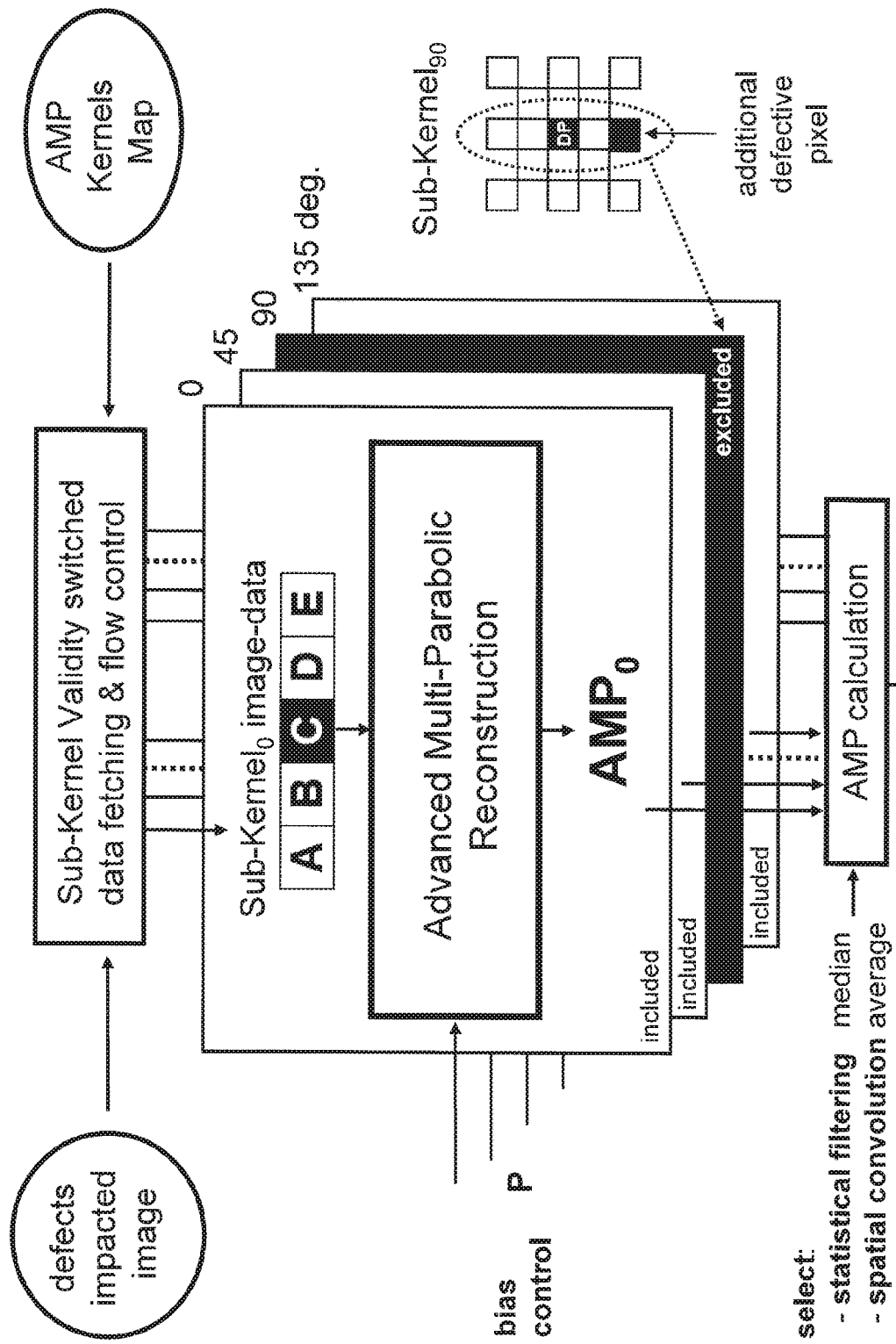
FIG. 4 represents the AMP reconstruction process which is executed for each defective pixel.

FIG. 4 represents the AMP reconstruction process.

This process is performed for each defective pixel in the AMP Kernels Map as one of the real-time image corrections executed on each incoming, defect impacted image.

The AMP process consists of up to 4 independent, advanced multi-parabolic reconstruction sub-processes which are executed in the contributing sub-kernel directions indicated by the adaptive AMP Kernels Map structure.

First the defective pixel map adaptive AMP kernel geometry is read from the AMP Kernels Map to determine the contributions of the four different sub-kernels.

The example shows how sub-kernel$_{90}$ is excluded due to the presence of an other defective pixel inside that sub-kernel. Then the four image-data are fetched for each contributing sub-kernel according to the sub-kernel geometry model and this data is assigned to the sub-kernel's ABDE register. Once all the image-data sets are loaded into the ABDE registers for the up to 4 contributing sub-kernels their directional $AMP_i$ reconstruction values are calculated.

The Kernel's overall AMP reconstruction value for the defective pixel under correction is obtained by performing AMP calculations on the various, directional $AMP_i$ reconstruction results taken into account.

Figure 5:
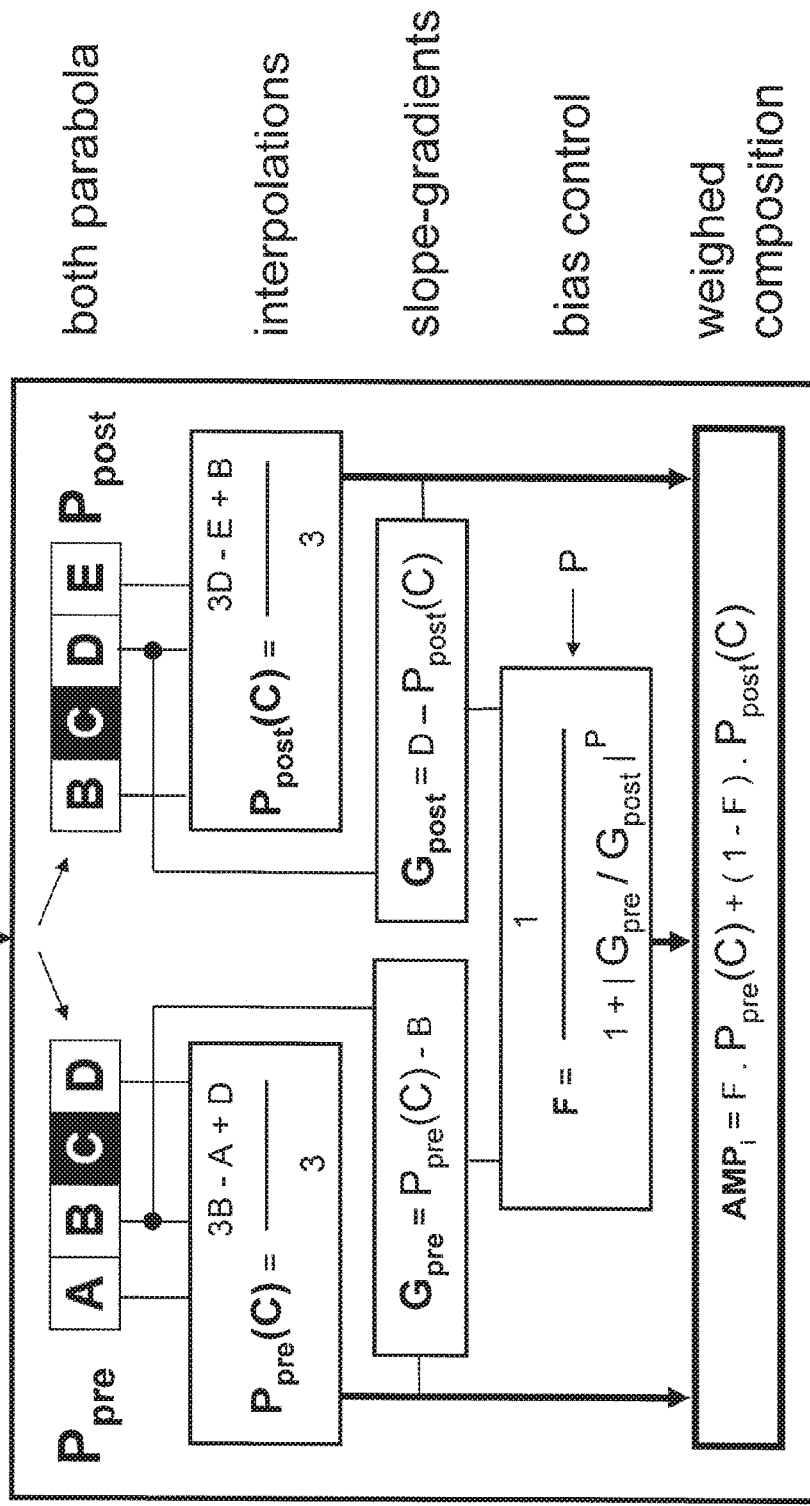
FIG. 5 shows the $AMP_i$ calculations which are executed for each contributing sub-kernel.

FIG. 5 shows the $AMP_i$ calculation process acting on the defective pixel's neighboring image-data.

This process is executed for each of the contributing sub-kernel directions of the adaptive AMP kernel.

First the ABDE image-data centered about the missing defective pixel data DP at location C is split into the AB-D data-sequence for a pre-DP biased interpolation using the parabola $P_{pre}$ and into the B-DE data-sequence for a post-DP biased interpolation using the parabola $P_{post}$. Both parabola are uniquely defined by means of their three assigned image-data points. Next two reconstructions: $P_{pre}(C)$ and $P_{post}(C)$ are calculated for the missing defective pixel data DP at position C by means of two parabolic interpolations. Given that the locations of the consecutive elements in the data-sequences: ABCD and BCDE are consecutive and line-wise equidistantly arranged in the image according to the sub-kernel's geometry, the parabolic interpolations: Ppre (C) and Ppost(C) are calculated solely relying on the parabola's three image-data elements:

$$P_{pre}(C)=(3 \cdot B-A+D)/3 \text{ and } P_{post}(C)=(3 \cdot D-E+B)/3$$

If the sub-kernel's $AMP_i$ value would be calculated as the pure average of both pre- and post-DP parabolic interpolations, disturbing over- and undershoot of the reconstructed data will inevitably occur at the end of upward and downward step-slopes as will be explained from FIG. 9 further on.

The $AMP_i$ value is calculated as a bias-regulated, weighed composition of both pre- and post-DP parabolic interpolation values to avoid this problem. This bias with direct impacts on the weights used during composition, is determined by means of an advanced mechanism shown in the center of the processing diagram.

For a weight-factor F=0 the complementary weight-factor (1-F)=1 and an $AMP_i$=Ppre(C) will result. In this case the $AMP_i$ value calculated will be fully biased towards the Ppre(C) value.

For F=0.5 the complementary weight-factor (1-F)=0.5 too and the $AMP_i$ will be calculated as (Ppre(C)+Ppost(C))/2, the pure average of both pre- and post-parabolic interpolations.

In this fully balanced situation the $AMP_i$ is neither biased towards Ppre (C) nor biased towards Ppre(C).

For a weight-factor F=1 the complementary weight-factor (1-F)=0 and an $AMP_i$=Ppost(C) will result. In this case the $AMP_i$ calculated will be fully biased towards the Ppost(C) value.

The calculated $AMP_i$ will be partially biased towards Ppre(C) for F-values between 0 and 0.5 and for F-values between 0.5 and 1 the $AMP_i$ will be partially biased towards Ppost(C).

By limiting the value of the bias control factor F to the range: [0<F<1], the sub-kernel's reconstructed value $AMP_i$ will either lay somewhere in-between both pre- and post-parabolic interpolated DP values or will be equal to one of both values.

To determine the value of the bias control factor F, the steepness or local gradient values of the Ppre and Ppost parabola are assessed near the defective pixel reconstruction point. Both locations for parabolic gradient determination are deliberately chosen to be in the middle between B and DP(C) for parabola Ppre and in the middle between DP(C) and D for parabola $P_{post}$. These locations, at half pixel distance from the defective pixel location C, are also the center positions of the ABCD and the BCDE image-data segments of both parabola. Relying on a parallelism-property of a parabola's gradient-line and cord, the choice for these specific steepness-assessment locations makes it possible to calculate the half pixel pre- and post-direction biased local gradients of the Ppre and Ppost parabola by simply determining the differences between their cord points:

$$G_{pre}(BC)=P_{pre}(C)-B \text{ and } G_{post}(CD)=D-P_{post}(C)$$

Once the local gradients near the reconstruction point are calculated for the $P_{pre}$ and $P_{post}$ parabola also the absolute value of their slope-gradients ratio $|G_{pre}/G_{post}|$ is calculated to determine the position of the reconstructed defective pixel relative to upward or downward step-slopes.

When the defective pixel is located on a quasi linear image-data slope or near the edge-region of a sigmoid image-data slope, the local parabola-gradients at half pixel distance before and after the central defective pixel will be about equally strong. In this case the slope-gradient ratio approximates unity and there is no risk for over- or under-shooting $P_{pre}(C)$ or $P_{post}(C)$ reconstruction values requiring a strongly unbalanced, weighed composition of the $AMP_i$ value.

Figure 6:
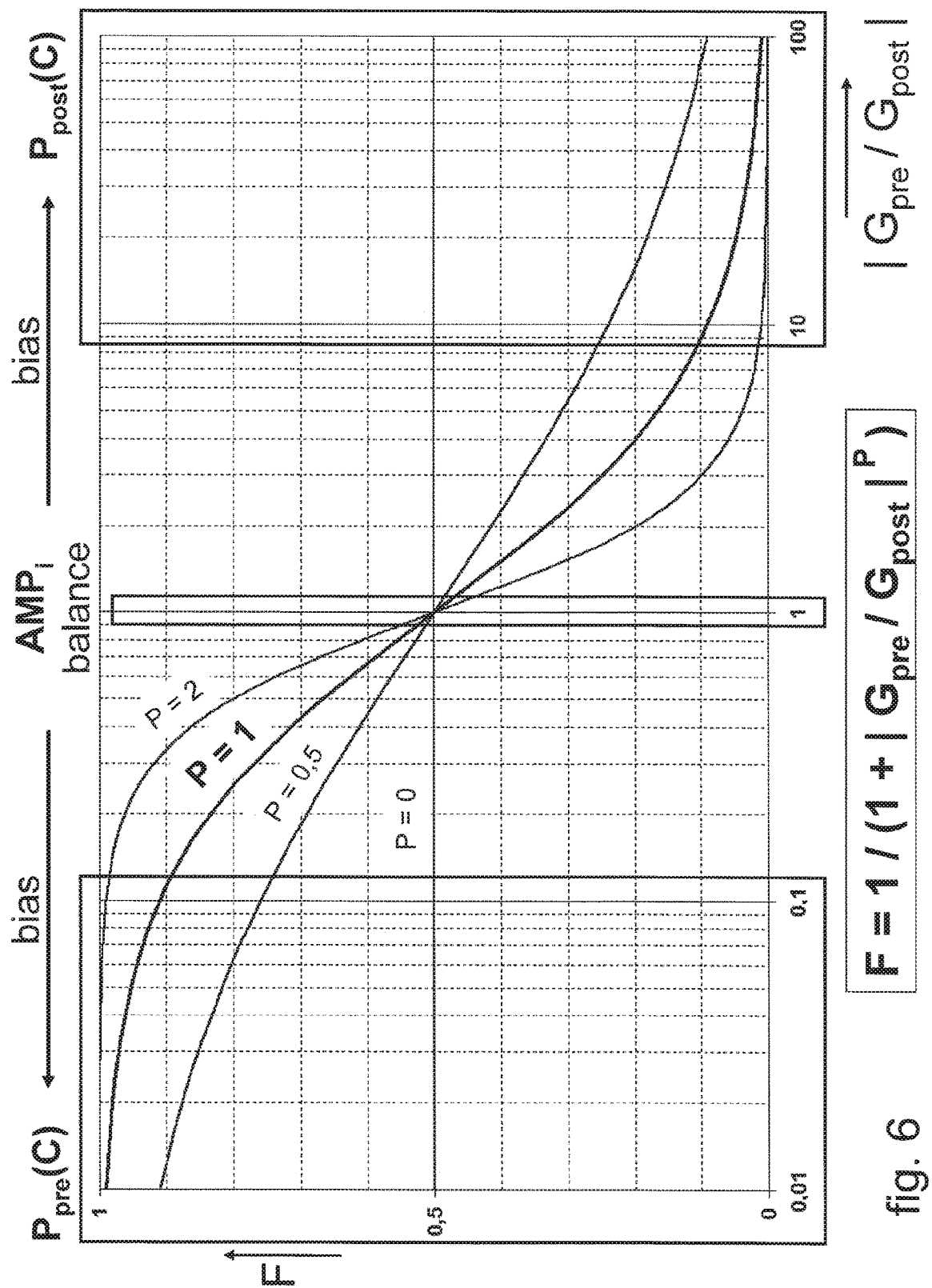
FIG. 6 is a graphical representation of the slope-gradient ratio controlled weight-factor F for various settings of the bias control sensitivity parameter P.

In case the defective pixel is located near the end points of sigmoid or quasi step-shaped slopes, the absolute value of the slope gradient ratio can either rapidly degrade to a near zero value or suddenly increase to a near infinity value as will be shown in FIG. 6.

FIG. 6 demonstrates the impact of the $|G_{pre}/G_{post}|$ slope gradients ratio and of the bias control sensitivity parameter P on the $AMP_i$ bias control factor F which is calculated as:

$$F=1/(1+|G_{pre}/G_{post}|^P)$$

The F-curves obtained for various settings of the bias sensitivity parameter show that the steepness of the bias-profile can be predetermined by the value of P. For a P=0 the bias control system is completely deactivated since the calculated $AMP_i$ will equal to the average of the Ppre(C) and Ppost(C) interpolated values regardless of the slope-gradient ratio. Gradually increasing the P value to unity increases the strength of the bias control thus initially reducing and later on preventing under- or overshoot situations at step-slope extremity reconstructions. For values of P equal to unity or above the impact of the bias control on the $AMP_i$ reconstruction is already more than sufficient to fully prevent under- or overshoot as is shown in FIG. 9.

Figure 7:
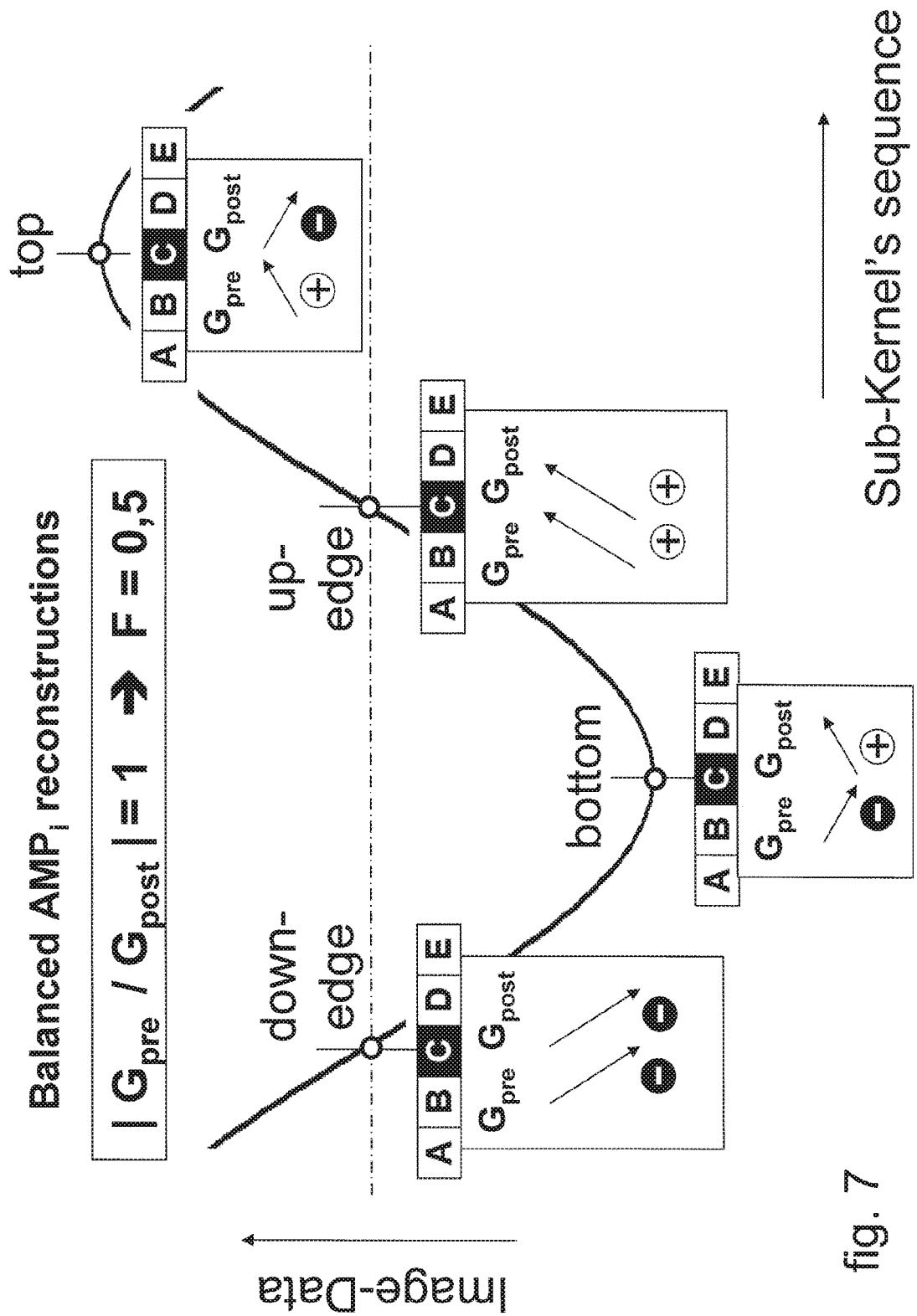
FIG. 7 shows several sub-kernel data instances resulting into equally balanced pre- and post parabolic interpolation contributions.

FIG. 7 shows several sub-kernel data instances resulting into equally balanced pre- and post parabolic interpolation contributions.

For each of the indicated defective pixel reconstruction locations situated on the image-data profile, the absolute value of the sub-kernel's |Gpre/Gpost| slope-gradient ratio equals unity resulting in an F=0.5 which deactivates the advanced automatic bias control system during reconstruction.

As seen for the sub-kernel data instances presented, the strength of the pre-DP and post-DP slope-gradients is equal regardless of their gradient polarities. By consequence the bias control system also shuts down automatically for the bottom and for the top locations on the image-data profile where the $AMP_i$ reconstruction must generate lower or higher image-data values than available in the defective pixel's immediate neighborhood.

FIG. 8 shows several sub-kernel data instances at the slope-start and the slope-end extremities of strongly sigmoid upward or downward image-data step-slopes.

It is obvious from these four reconstruction locations, represented by their corresponding sub-kernel image-data profiles, that the absolute value of the slope-gradient ratio will be much lower than unity for the slope-start instances and much higher than unity for the slope-end instances. Regardless of whether the bias control factor F will be below or above 0.5, the |slope-gradient ratio|-sensitive automatic bias control system will always pull the $AMP_i$ reconstruction point towards the parabolic interpolation point located on the parabola with the least steep local gradient to reduce or prevent disturbing under- or overshoot reconstructions.

Figure 9:
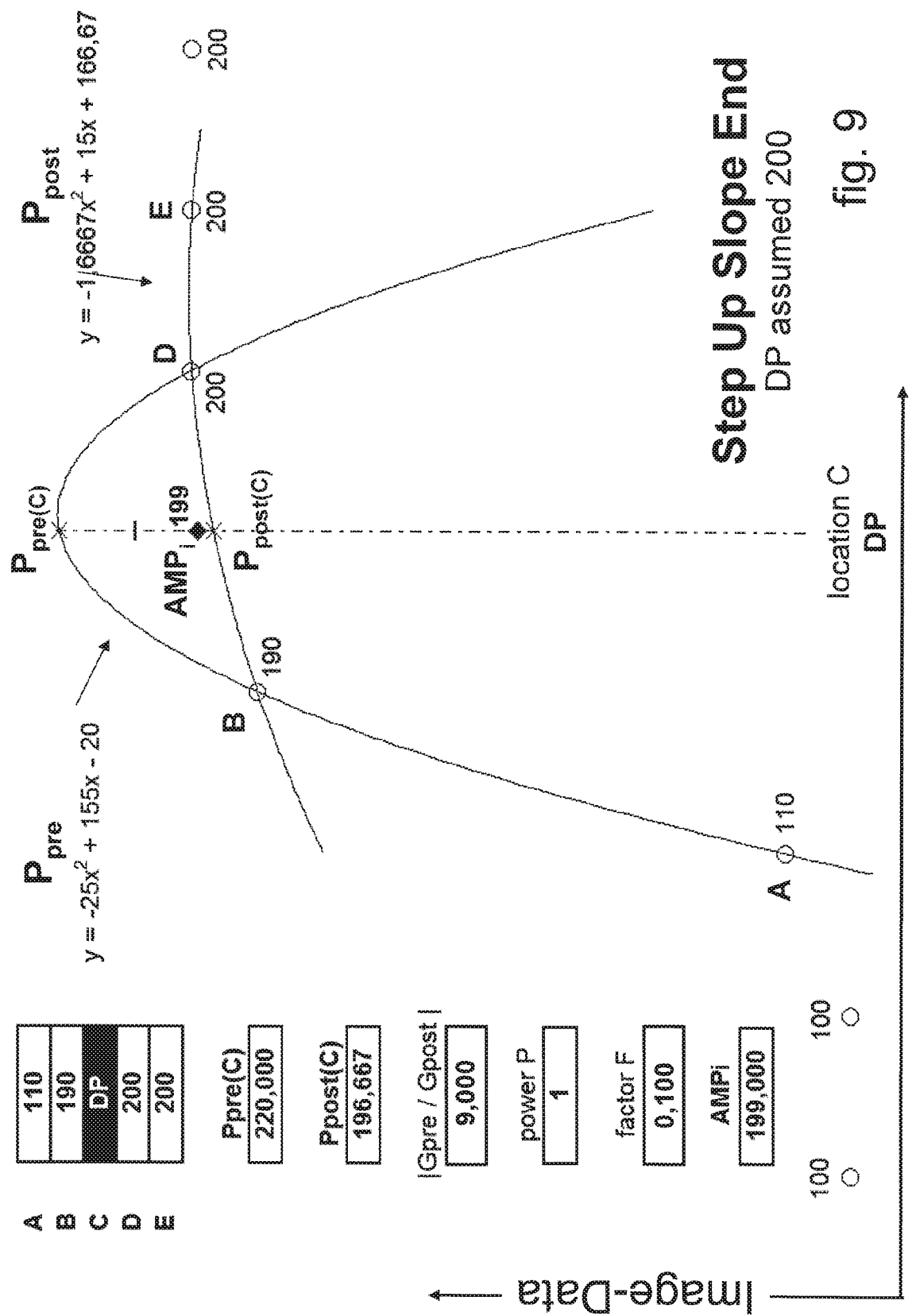
FIG. 9 is an example of an $AMP_i$ reconstruction at the post parabolic interpolation biased plateau-end of an upward sub-kernel data instance.

FIG. 9 is an example of an $AMP_i$ reconstruction at the post parabolic interpolation biased plateau-end of an upward sub-kernel data instance. Knowledge about the formulas of the parabola $P_{pre}$ and $P_{post}$ shown are not a prerequisite for $AMP_i$ reconstruction. All the calculations necessary to compute both parabolic interpolation points and both parabolic local gradients only rely on the knowledge of the Sub-Kernel$_i$'s four, non defective image-data elements: A=110, B=190, D=200 and D=200. Shown is a sigmoid, upward step-slope profile with the consecutive image pixel values: . . . 100, 100, 110(A), 190(B), 200 (the defective pixel DP under reconstruction in location C), 200(D), 200 (E), 200 . . . between the plateau levels 100 and 200. Without the intervention of the $AMP_i$ reconstruction bias control system, factor F would equal 0.5 resulting into an overshooting, pure average reconstruction value=(Ppre(C)+Ppost(C))/2=(220+196,667)/2=208,334 as indicated by the horizontal stripe located exactly in the middle of both cross-marked parabolic interpolation points on the vertical axis at DP's location C.

Figure 10:
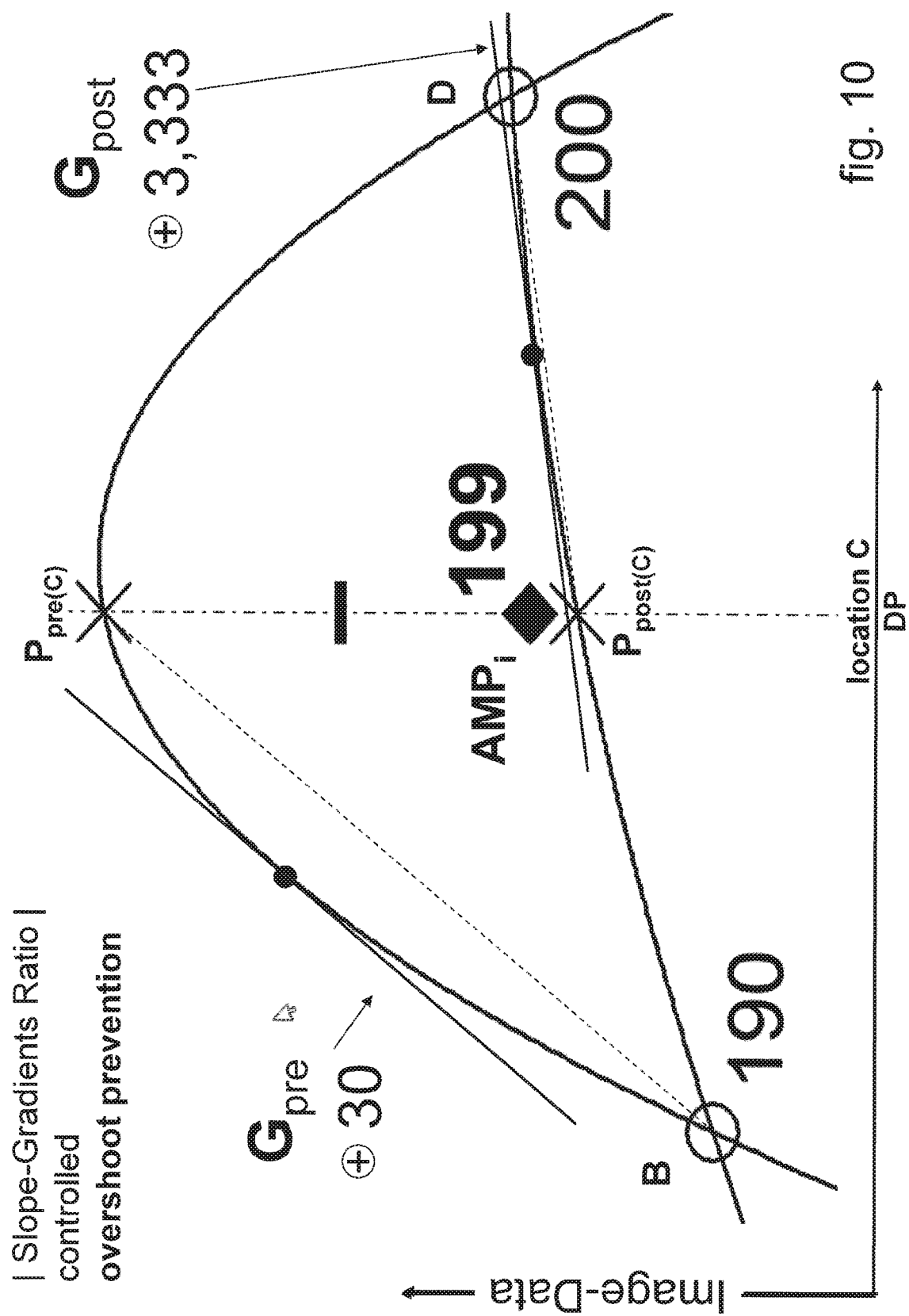
FIG. 10 shows a detail of the pre- and post-parabolic slope gradients surrounding the sub-kernel's reconstruction point in FIG. 9.

FIG. 10 shows a detail of this upward step-slope extremity near the plateau level 200. The steepness of the local parabolic gradients: $G_{pre}$=+30 and $G_{post}$=+3,333 are represented by the tangent-lines through the BC and the CD middle location points on the Ppre and Ppost parabola. The absolute value of the slope-gradient ratio=9,000 and this leads to a bias control factor F=0,100. By consequence the AMP' reconstructed value for the defective pixel DP (with an original value of 200) will be highly biased towards the Ppost(C) cross-mark and settles at a value=199. This reconstruction value is obtained for the bias control sensitivity parameter P=1 and is located just below the plateau level 200 which means that overshoot of the defective pixel reconstruction value has been prevented by the advanced bias control system.

Figure 11:
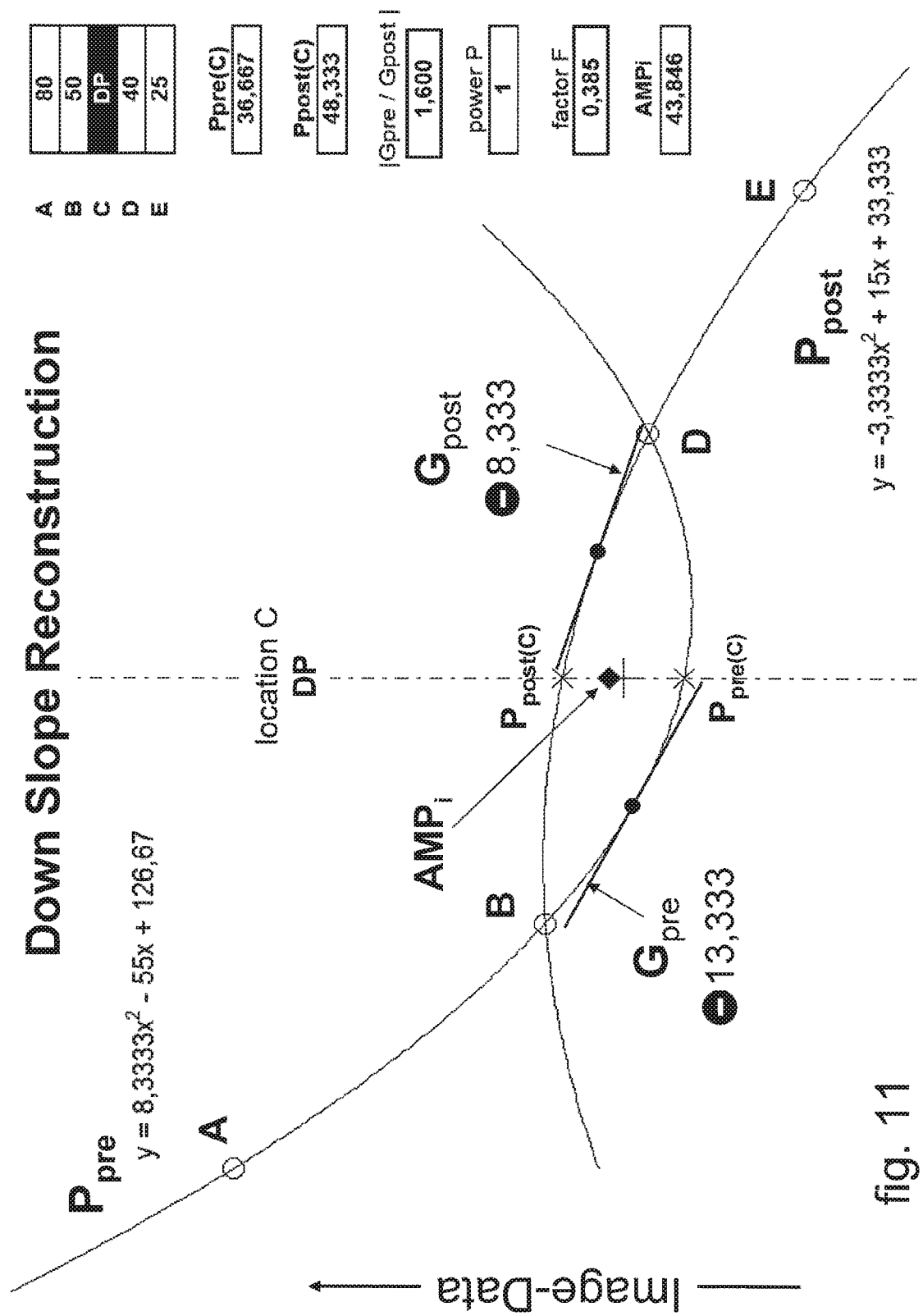
FIG. 11 is an example of a downward slope $AMP_i$ reconstruction instance.

FIG. 11 shows an example of downward slope reconstruction where the parabola's local gradients are both negative and not equal. The calculated AMP' reconstruction value=43,846 and is slightly pulled towards the parabola with the smallest steepness by the automatic bias control system.

Figure 12:
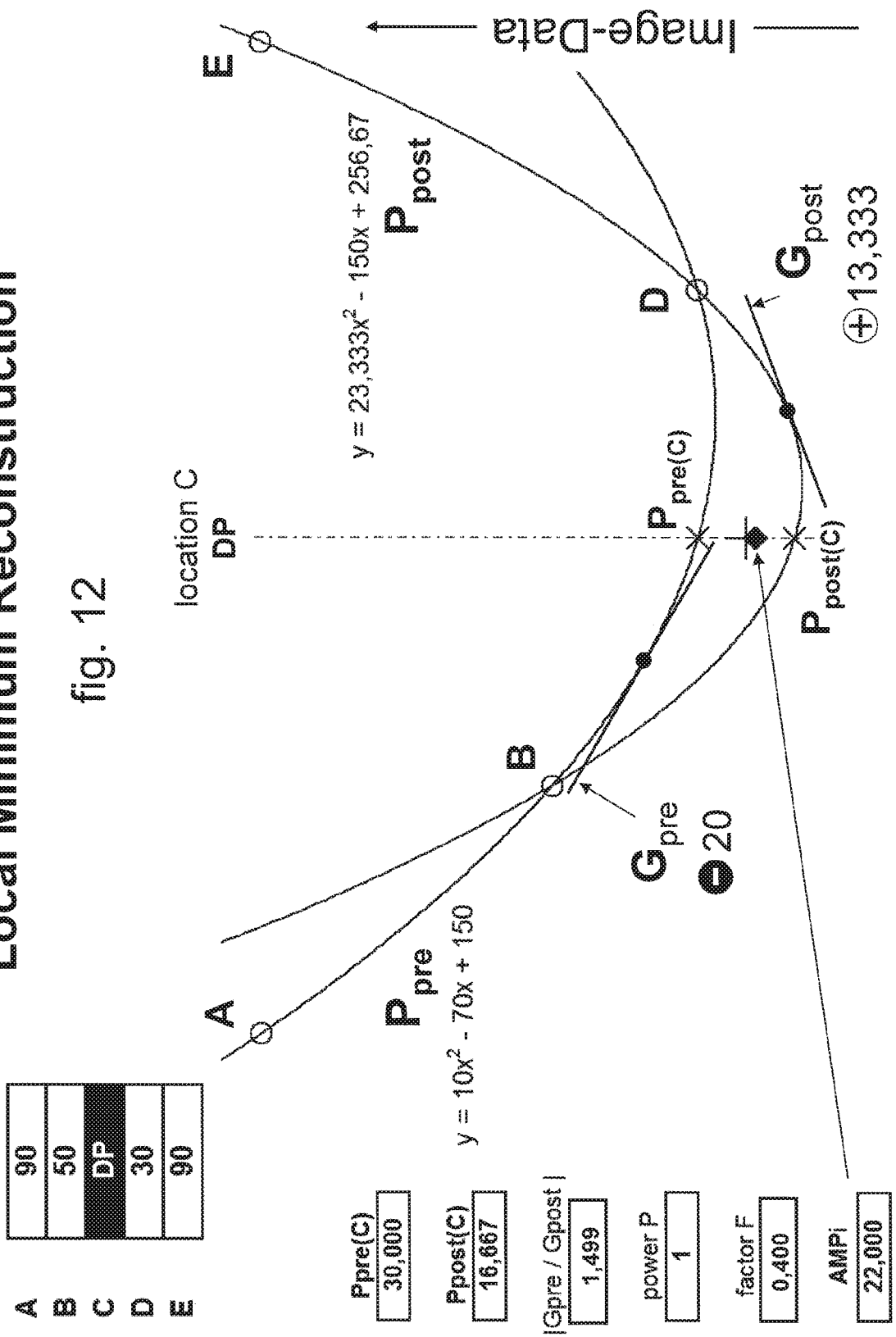
FIG. 12 is an example of a local minimum $AMP_i$ reconstruction instance.

FIG. 12 shows an example of a reconstruction for a defective pixel located at a local minimum position on the image-data curve. The polarities of the local parabola gradients: Gpre=−20 and Gpost=+13,333 are typically opposed now. The obtained $AMP_i$ value=22,000 and is located well below the level of its lowest surrounding non-defective image pixels: B=50 on the $P_{pre}$ parabola and D=30 on the $P_{post}$ parabola. Due to the not perfectly symmetrical arrangement of both parabola relative to the DP location the sub-kernel's reconstruction value $AMP_i$ is slightly corrected towards the parabolic interpolation point on the $P_{post}$ parabola with the least steep local gradient $G_{post}$.

Figure 13:
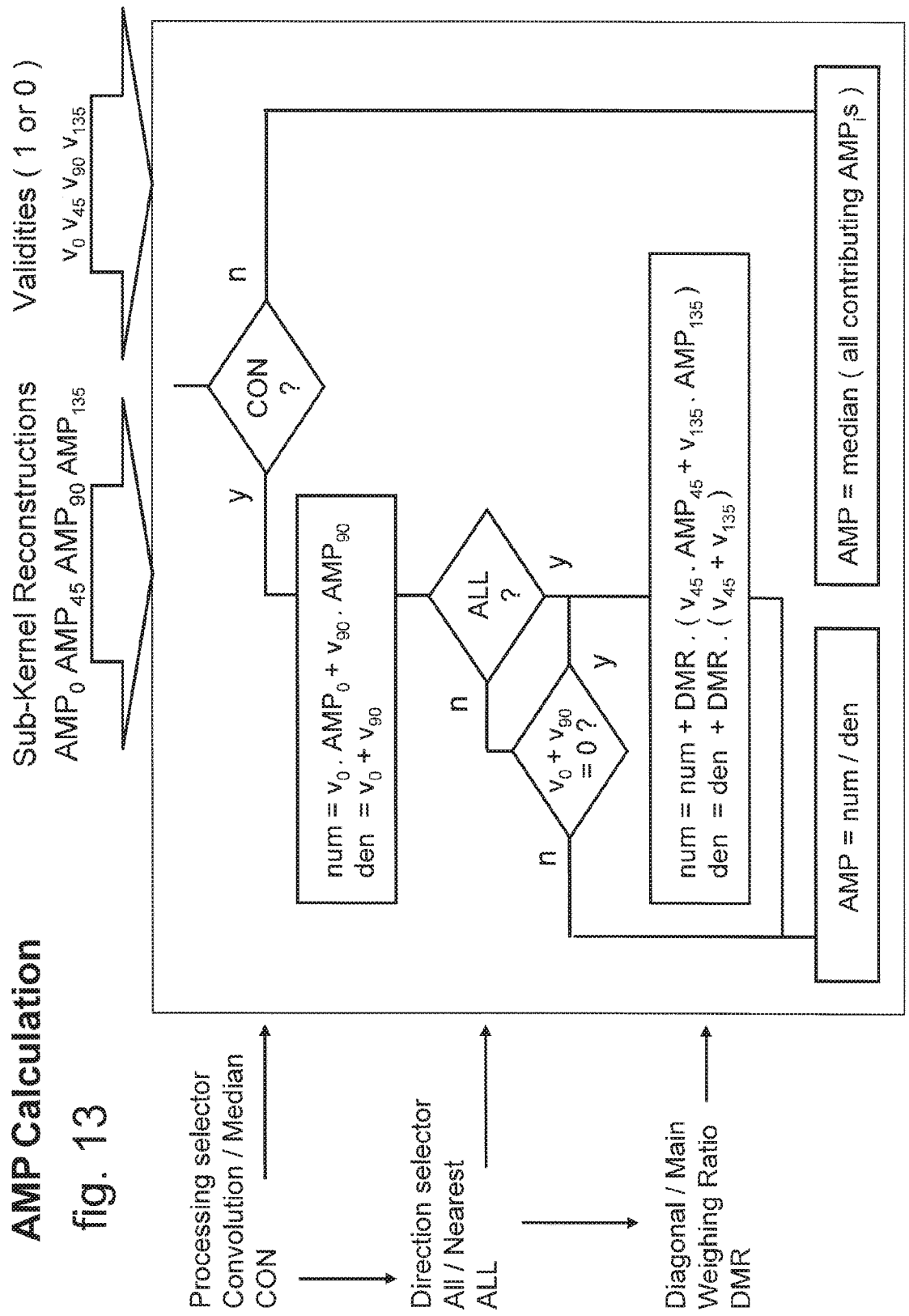
FIG. 13 represents the AMP calculation flow-diagram including its sub-kernel reconstruction inputs, functional selectors and parameter controls.

FIG. 13 represents the AMP calculation flow-diagram.

The final reconstruction value for the adaptive composed kernel is calculated based on the various contributing $AMP_i$ sub-kernel reconstructions for the contributing reconstruction directions.

This process is performed by first evaluating the sub-kernel validities: $v_0$, $v_{45}$, $v_{90}$ and $v_{135}$ and by reading their accompanying $AMP_i$ reconstruction values for the four possible sub-kernel directions.

A validity $v_i$=0 was assigned upfront to sub-kernel directions which were excluded for reconstruction due to the presence of a neighboring defective pixel. The validity values of all contributing sub-kernel direction equal 1. These directional $v_i$ validities act as multiplicative weights or switches during the calculation of the AMP value.

Next the upfront defined various selectors and parameters from the AMP Model & Reconstruction Control block in FIG. 1 are evaluated to determine how the relevant $AMP_i$ sub-kernel reconstruction values should be processed.

A processing selector determines whether a directional convolution or a statistical median algorithm must be used for the kernel-based reconstruction.

In case of median selection the defective pixel's value is determined as the median value of all the contributing $AMP_i$ reconstruction values.

If convolution is selected the AMP reconstruction value is calculated as the result of a weighed polynomial of which the summed and averaged different components are the up to four directional $v_i$.$AMP_i$ products related to the contributing sub-kernel reconstruction values. An ALL or NEAREST directional selector makes it possible to limit the scope of the directional convolution process to only the $AMP_i$ reconstruction(s) in the nearest 1 (or 2 if at the same distance) direction(s) or to calculate the convolution value for all the contributing sub-kernel directions. The additional Diagonal/Main Weighing Ratio (0<DMR<1) parameter input is used to reduce the importance of the diagonal AMP45 and AMP135 sub-kernel reconstructions during the calculation. This reflects the higher importance of the AMP0 and AMP90 sub-kernel reconstructions since their neighboring image-data pixels are located closer to the defective pixel than the neighboring image-data pixels in both diagonal directions.

In case a convolution for all the contributing sub-kernel directions is selected the adaptive kernel's AMP reconstruction value for the defective pixel DP is calculated as a $v_i$-switched and DMR-weighed $AMP_i$-average value:

$$AMP = \frac{v_0 \cdot AMP_0 + v_{90} \cdot AMP_{90} + DMR \cdot (v_{45} \cdot AMP_{45} + v_{135} \cdot AMP_{135})}{v_0 + v_{90} + DMR \cdot (v_{45} + v_{135})}$$

Figure 14:
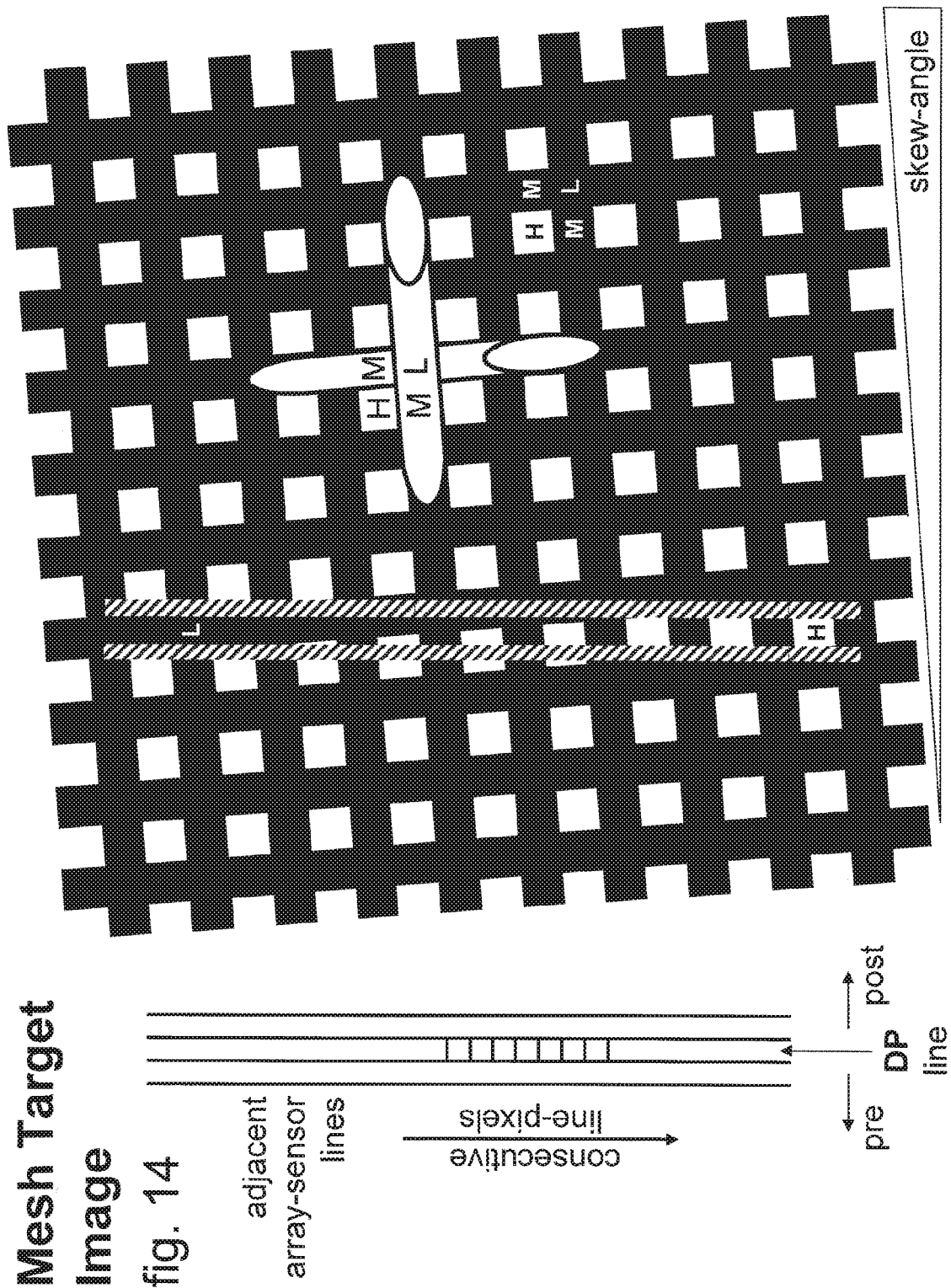
FIG. 14 is a geometry example of defective line of the array-sensor which image-wise coincides with the x-ray shadow of a skewed, high spatial frequency mesh-target.

FIG. 14 shows how a completely defective line of the array-sensor, composed of consecutive pixels for which a defective pixel reconstruction values must be calculated, coincides image-wise with the x-ray shadow of a skewed, high spatial frequency mesh target as used for mammography quality control purposes. The mesh target, positioned at a small skew angle relative to the array-sensor during exposure, contains of perpendicularly woven structure of thin cylindrical, x-ray absorbing wires. The diameter of these wires is about 320 micron, nearly 2.5× the 125 micron pixel-pitch of the sensor-array used.

The 2D high spatial frequency mesh-modulated x-ray field impinging on the entry-surface of the flat panel detector mainly consists of three different exposure level states. H-labeled x-rays passing through the square holes of the wire-mesh are least attenuated and are represented by the highest signals observed in the pixel-resolved image-data. M-labeled x-rays passing through a single mesh wire are attenuated and generate the near average image-signal levels. L-labeled x-rays passing through both mesh target wires at the overlap are attenuated twice and associated with the lowest signal levels in the captured mesh shadow image. This impinging x-ray modulation pattern has a square-shaped periodicity of about 640 micron in each of the main mesh directions thus covering an area of approximately 26 image pixels. For small skew angles this x-ray field produces a line-wise repeating image-data profile with a period of about 5 consecutive line-pixels in both main image directions.

Figure 15:
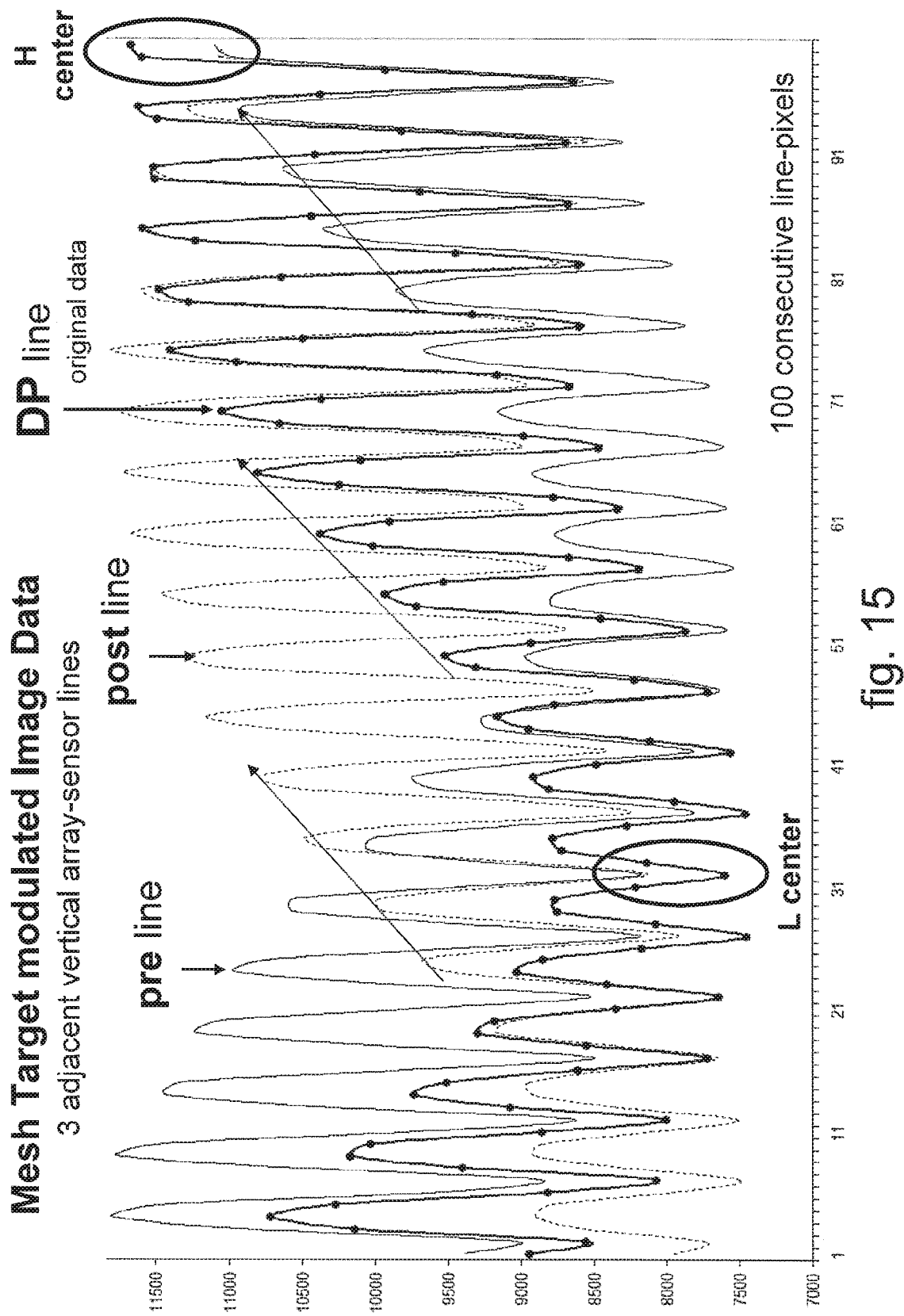
FIG. 15 shows profiles of the mesh-target modulated image-data as sampled by 100 consecutive pixels in 3 adjacent array-sensor lines, including the DP-line, for the FIG. 14 geometry.

FIG. 15 shows the profiles of the slightly skewed mesh-target modulated image-data as sampled by 100 consecutive pixels in 3 adjacent, vertical array-sensor lines: the first pre-line, the DP-line containing all the consecutive defective pixels and the first post-line.

As explained in FIG. 14 the x-ray exposed mesh target absorption causes a nearly sine-wave shaped, high frequency modulation of the image-data. The periodicity of that repeating data pattern measures approximately 5 consecutive line-pixels. Looking at the thick central line profile which represents the non-defective image signals, also a much slower superposed sine-wave modulation with a period of approximately 140 consecutive pixels seems to be present in the vertical line data. This low frequency component is mainly controlled by the skew angle and represents the number of vertical line pixels needed to move from one nearly vertical, skewed mesh-wire to the next or previous wire. That slowly moving background signal has its minimum when the vertical pixel-line passes through the center of the crossing mesh-wires and it is at maximum when the pixel line passes through the center of the square hole between the absorbing mesh-wires.

Identical image-data profiles are present in the pre-line and post-line which are direct neighbor lines of the central defective pixel line in FIG. 14.

Note how the image data content of these neighboring lines is similar to the signals in the DP-line and how this content is forward and backward phase-shifted with about 26 pixels due to the pixel-pitch and the skew angle of the mesh target. This bi-directionally and high spatial frequency modulated mesh shadow image with one vertical defective sensor line (of which the original non defective pixel data is used as reference data set) was subjected to the 5×5 kernel advanced multiparabolic defective line reconstruction algorithm as well as to a 3×3 kernel average and a 3×3 kernel median direct neighbor reconstruction algorithms for performance comparison.

Figure 16:
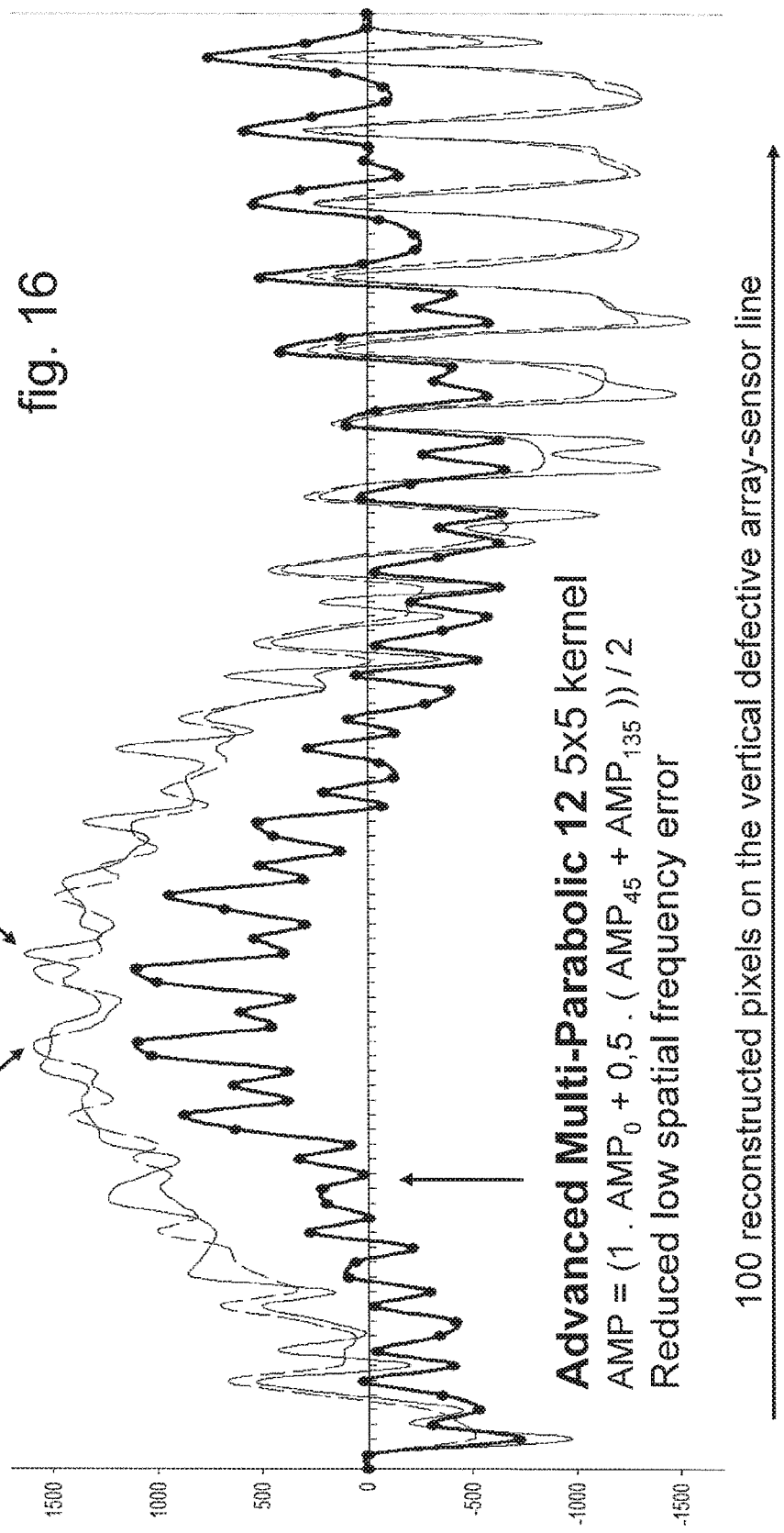
FIG. 16 shows profiles of the defective line reconstruction errors generated by various reconstruction algorithms, including AMP, relative to the original mesh-target image-data shown in FIG. 15.

FIG. 16 shows the profiles of the residual defective line reconstruction errors generated by various reconstruction algorithms, including AMP, relative to the original mesh-target image-data reference profile shown in FIG. 15. The 3×3 direct neighbor average and the 3×3 direct neighbor median reconstruction kernels have 3 non-defective pixels in the pre-line and 3 non-defective pixels in the post-line since the vertical, defective line direction is completely blocked by 2 additional defective pixels: one just above DP and one just below DP. This situation leads to significant reconstruction errors in the defective sensor line locations especially when the normal image data at the defective pixel line is higher or lower than its 6 surrounding neighborhood data elements from which the average or median value is calculated during direct neighbor reconstruction. The thus introduced low frequency reconstruction errors are very visibly like Moiré effects due to the nature of the slowly changing superposed background signal controlled by the skew angle and the pitch of the mesh target. When the advanced multi-parabolic algorithm is used for defective line reconstruction by means of a directional $AMP_i$ convolution performed in all three, remaining sub-kernel directions (12 non-defective pixels used) and a DMR=0.5 the general AMP reconstruction formula becomes:

$$AMP=(1 \cdot AMP_0 + 0,5 \cdot (AMP_{45} + AMP_{135}))/2$$

As seen from that AMP 12 reconstruction error profile, the disturbing low frequency error obtained is much smaller now because the highest en lowest original signal values at the DP-line are much better preserved by the various multi-parabolic interpolations involved during reconstruction.

The invention claimed is:

1. A method for correcting defective pixel artifacts in a direct radiography image by executing, for a defective pixel of a direct radiography sensor used to generate the direct radiography image, the steps of:
   obtaining information on a defective state of image pixels surrounding the defective pixel based on a defective pixel map indicating a defective state or a non-defective state of each individual sensor pixel as a function of a location in a sensor array;
   based on the information, composing an adaptive horizontal, vertical, or diagonal direction 5×1 reconstruction kernel including kernel elements that refer to a first non-defective image pixel pair located immediately before the defective pixel and to a second non-defective image pixel pair located immediately after the defective pixel;
   obtaining image data associated with locations of the first non-defective image pixel pair and the second non-defective image pixel pair in the adaptive reconstruction kernel;
   defining a first parabola and calculating a pre-parabolic interpolation value at a location of the defective pixel using a parabolic interpolation based on the first parabola using both the image data from the first non-defective image pixel pair and image data from a pixel located immediately after the defective pixel;
   defining a second parabola and calculating a post-parabolic interpolation value at the location of the defective pixel using parabolic interpolation based on the second parabola using both the image data from the second non-defective image pixel pair and image data from a pixel located immediately before the defective pixel;

processing the pre-parabolic interpolation value and the post-parabolic interpolation value to calculate a replacement value for image data of the defective pixel; and replacing the image data of the defective pixel with the replacement value.

2. The method according to claim 1, wherein the replacement value is obtained by calculating a weighted average value using the pre-parabolic interpolation value and the post-parabolic interpolation value and weight-factors associated with the pre-parabolic interpolation value and the post-parabolic interpolation value.

3. The method according to claim 2, wherein a first one of the weight-factors F is determined to be within a range from 0 to 1 using an adaptive bias control system, and a second weight-factor is determined to be 1-F.

4. The method according to claim 3, wherein the adaptive bias control system calculates a bias control weight-factor using slope gradients of the first parabola and the second parabola, the slope gradient of the first parabola is calculated as a difference between the pre-parabolic interpolation value and the image data at the pixel located immediately before the defective pixel, and the slope gradient of the second parabola is calculated as a difference between the image data at the pixel located immediately after the defective pixel and the post-parabolic interpolation value.

5. The method according to claim 4, wherein the bias control weight-factor is calculated from an absolute value of a ratio of the slope gradients raised to a power of a settable bias control sensitivity parameter.

6. The method according to claim 5, wherein the slope gradient of the first parabola is calculated at a location in a middle between the defective pixel and the pixel located immediately before the defective pixel, and the slope gradient of the second parabola is calculated at a location in a middle between the defective pixel and the pixel located immediately after the defective pixel.

7. The method according to claim 1, wherein the adaptive reconstruction kernel of the defective pixel is obtained by combining multiple, defect-free main or diagonal direction 5×1 pixel kernels, and the replacement value is calculated as a weighted average directional convolution of individual replacement values calculated for contributing directional kernels.

8. The method according to claim 7, wherein weight-factors used in the weighted average directional convolution calculation are different for the main direction and the diagonal direction.

9. The method according to claim 1, wherein the adaptive reconstruction kernel is obtained by combining multiple, defect-free horizontal, vertical, or diagonal direction 5×1 pixel kernels, and the replacement value is calculated as a median value of individual replacement values calculated for contributing directional kernels.

10. A non-transitory computer readable medium comprising computer executable program code adapted to carry out, when run on a computer, the method according to claim 1.

* * * * *